(12) United States Patent
Ramsay (10) Patent No.: US 9,134,156 B2
(45) Date of Patent: *Sep. 15, 2015

(54) DETERMINATION OF REFERENCE VALUES FOR ULTRASONIC FLOW METERING SYSTEMS

(71) Applicant: DANIEL MEASUREMENT AND CONTROL, INC., Houston, TX (US)

(72) Inventor: Lawson Hamilton Ramsay, Falkirk (GB)

(73) Assignee: DANIEL MEASUREMENT AND CONTROL, INC., Houston, TX (US)

(*) Notice: Subject to any disclaimer, the term of this patent is extended or adjusted under 35 U.S.C. 154(b) by 134 days.

This patent is subject to a terminal disclaimer.

(21) Appl. No.: 13/928,692

(22) Filed: Jun. 27, 2013

(65) Prior Publication Data

US 2014/0109645 A1    Apr. 24, 2014

Related U.S. Application Data

(60) Provisional application No. 61/716,160, filed on Oct. 19, 2012.

(51) Int. Cl.
*G01P 21/00* (2006.01)
*G01F 1/66* (2006.01)
*G01F 1/00* (2006.01)

(52) U.S. Cl.
CPC ... *G01F 1/66* (2013.01); *G01F 1/00* (2013.01)

(58) Field of Classification Search
CPC ..... G01M 3/2815; G08B 17/04; G01F 1/667; G01F 1/662
USPC ............... 73/861.28, 861.27, 861.18; 702/48; 340/606

See application file for complete search history.

(56) References Cited

U.S. PATENT DOCUMENTS

| | | | | |
|---|---|---|---|---|
| 2014/0109686 A1* | 4/2014 | Ramsay | ..................... | 73/861.18 |
| 2014/0109689 A1* | 4/2014 | Ramsay | ..................... | 73/861.28 |
| 2014/0109690 A1* | 4/2014 | Ramsay et al. | ............ | 73/861.28 |
| 2015/0000420 A1* | 1/2015 | Ramsay | ..................... | 73/861.01 |

* cited by examiner

*Primary Examiner* — Jewel V Thompson
(74) *Attorney, Agent, or Firm* — Conley Rose, P.C.

(57) ABSTRACT

Apparatus and method for monitoring flow meter operation. In one embodiment, a flow metering system includes a flow meter and a condition monitor. The flow meter is configured to measure the volume of fluid flowing through the flow meter. The condition monitor is coupled to the flow meter is and configured to monitor a parameter of operation of the flow meter, and to record values of the parameter over a predetermined time interval. The condition monitor is further configured to determine reference values for the parameter based on the recorded values, and to apply the reference values to values of the parameter acquired after the predetermined time interval to validate operation of the flow metering system.

21 Claims, 7 Drawing Sheets

FIG. 6

DETERMINATION OF REFERENCE VALUES FOR ULTRASONIC FLOW METERING SYSTEMS

CROSS REFERENCE TO RELATED APPLICATION

The present application claims priority to U.S. Provisional Patent Application No. 61/716,160, filed on Oct. 19, 2012 which is hereby incorporated herein by reference in its entirety.

BACKGROUND

Natural gas is transported from place-to-place via pipelines. It is desirable to know with accuracy the amount of gas flowing in the pipeline, and particular accuracy is demanded when the fluid is changing hands, or "custody transfer." Even where custody transfer is not taking place, however, measurement accuracy is desirable, and in these situations, flow meters may be used.

Ultrasonic flow meters are one type of flow meter that may be used to measure the amount of fluid flowing in a pipeline. Ultrasonic flow meters have sufficient accuracy to be used in custody transfer. In an ultrasonic flow meter, acoustic signals are sent back and forth across the fluid stream to be measured. Based on parameters of received acoustic signals, the fluid flow velocity in the flow meter is determined. The volume of fluid flowing through the meter can be determined from determined flow velocities and the known cross-sectional area of the flow meter.

An ultrasonic flow metering system is subject to various conditions that affect the calibration, accuracy, and/or operation of the metering system. For example, accumulation of contaminants in the pipeline, flow restrictions, and/or differences or changes in operating environment with respect to calibration environment may affect flow meter accuracy. Accordingly, effective techniques for monitoring conditions related to flow meter operation and accuracy are desirable.

SUMMARY

Apparatus and method for monitoring flow meter operation are disclosed herein. In one embodiment, a flow metering system includes a flow meter and a condition monitor. The flow meter is configured to measure the volume of fluid flowing through the flow meter. The condition monitor is coupled to the flow meter is and configured to monitor a parameter of operation of the flow meter, and to record values of the parameter over a predetermined time interval. The condition monitor is further configured to determine reference values for the parameter based on the recorded values, and to apply the reference values to values of the parameter acquired after the predetermined time interval to validate operation of the flow metering system.

In another embodiment, a method for monitoring operation of a flow metering system includes acquiring and recording, by a monitoring system, values of a parameter of operation of the flow metering system during a predetermined reference initialization interval of operation of the flow metering system. Reference values for the parameter are determined based on the recorded values of the parameter. The operation of the flow metering system is validated by applying the reference values to values of the parameter acquired after the reference initialization interval.

In a further embodiment, a condition monitoring system for monitoring operation of a flow meter includes a reference initialization engine and a parameter verification engine. The reference initialization engine is configured to record values of a parameter of operation of the flow metering system over a predetermined initialization time interval of operation of the flow metering system, and to determine reference values for the parameter based on the recorded values. The parameter verification engine is configured to apply the reference values to values of the parameter acquired after the initialization time interval to validate operation of the flow metering system.

BRIEF DESCRIPTION OF THE DRAWINGS

For a detailed description of exemplary embodiments of the invention, reference will now be made to the accompanying drawings in which.

NOTATION AND NOMENCLATURE

In the following discussion and in the claims, the terms "including" and "comprising" are used in an open-ended fashion, and thus should be interpreted to mean "including, but not limited to . . . ." In addition, the term "couple" or "couples" is intended to mean either an indirect or a direct electrical connection. Thus, if a first device couples to a second device, that connection may be through a direct electrical connection, or through an indirect electrical connection accomplished via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors. The term "fluid" includes liquids and gases.

DETAILED DESCRIPTION

The following description is directed to various exemplary embodiments of the invention. The drawing figures are not necessarily to scale. Certain features of the embodiments may be shown exaggerated in scale or in somewhat schematic form and some details of conventional elements may not be shown in the interest of clarity and conciseness. The disclosed embodiments should not be interpreted, or otherwise used, to limit the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. It is to be fully recognized that the different teachings of the embodiments discussed below may be employed separately or in any suitable combination to produce desired results. Further, the various embodiments were developed in the context of measuring hydrocarbon flows (e.g., crude oil, natural gas), and the description follows from the developmental context; however, the systems and methods described are equally applicable to measurement of any fluid flow.

Ultrasonic flow metering systems include condition monitors (e.g., condition-based monitoring systems) to enable detection of changes in metering system operation and/or system operating conditions, and correction of conditions causing the changes. An ultrasonic meter condition monitor is a system that monitors the operation of the ultrasonic meter and associated instrumentation. A condition monitor may analyze the operation of the metering system by performing exemplary functions such as:

- detection of changes in flow characteristics such as flow profile, flow symmetry, flow swirl, flow turbulence, etc.
- detection of changes in results of ultrasonic diagnostics such as error rate in the detection of ultrasonic signals, gain levels, noise levels, peakswitch detection, etc.
- comparison of measured speed of sound from the ultrasonic flow meter to gas composition, pressure and temperature using the American Gas Association (AGA) 10 standard;
- comparison of measured temperature against temperature derived from the speed of sound; and
- comparison of density derived from a gas composition sensor (e.g., a gas chromatograph) to density derived from speed of sound.

Conventional condition monitors evaluate various operational parameters of a metering system, such as predicted flow characteristics, and generate alarms indicating that a value of an operational parameter exceeds a threshold. In conventional condition monitors, the threshold values applied to validate operation of the flow metering system are derived from a user provided flow characteristic curve of velocity versus profile factor, crossflow, symmetry, gain, or other velocity dependant parameter. Similarly, non-flow dependant but meter or installation dependant characteristics (such as those introduced through manufacturing tolerances, upstream/downstream pipe design, proximity to other equipment such as control valves, etc.) requires establishing the normal behaviour for the site, such that deviations from the expected behaviour can then be automatically identified.

To establish the "expected" characteristics of the various ultrasonic and secondary instrumentation diagnostics and parameter, offline analysis of post-installation metering system operating data is performed. The analysis is performed by personnel who are experienced in the normal range of characteristics of the various diagnostics. Such personnel are typically representatives of the ultrasonic meter manufacturer and not employed by end-user of the meter. The time and expense associated with bringing experienced personnel to the metering site to establish operational thresholds can be excessive, especially when multiple excursions are required to deal with condition changes that occur during the initial phases of metering system operation.

Embodiments of the condition monitor disclosed herein automatically determine the threshold values to be applied to validate operation of the flow metering system based on the behavior of a parameter to which the thresholds apply over a user defined initialization period. Thus, embodiments reduce and/or eliminate the time and expense associated with determination of monitoring thresholds by expert personnel.

Figure 1:
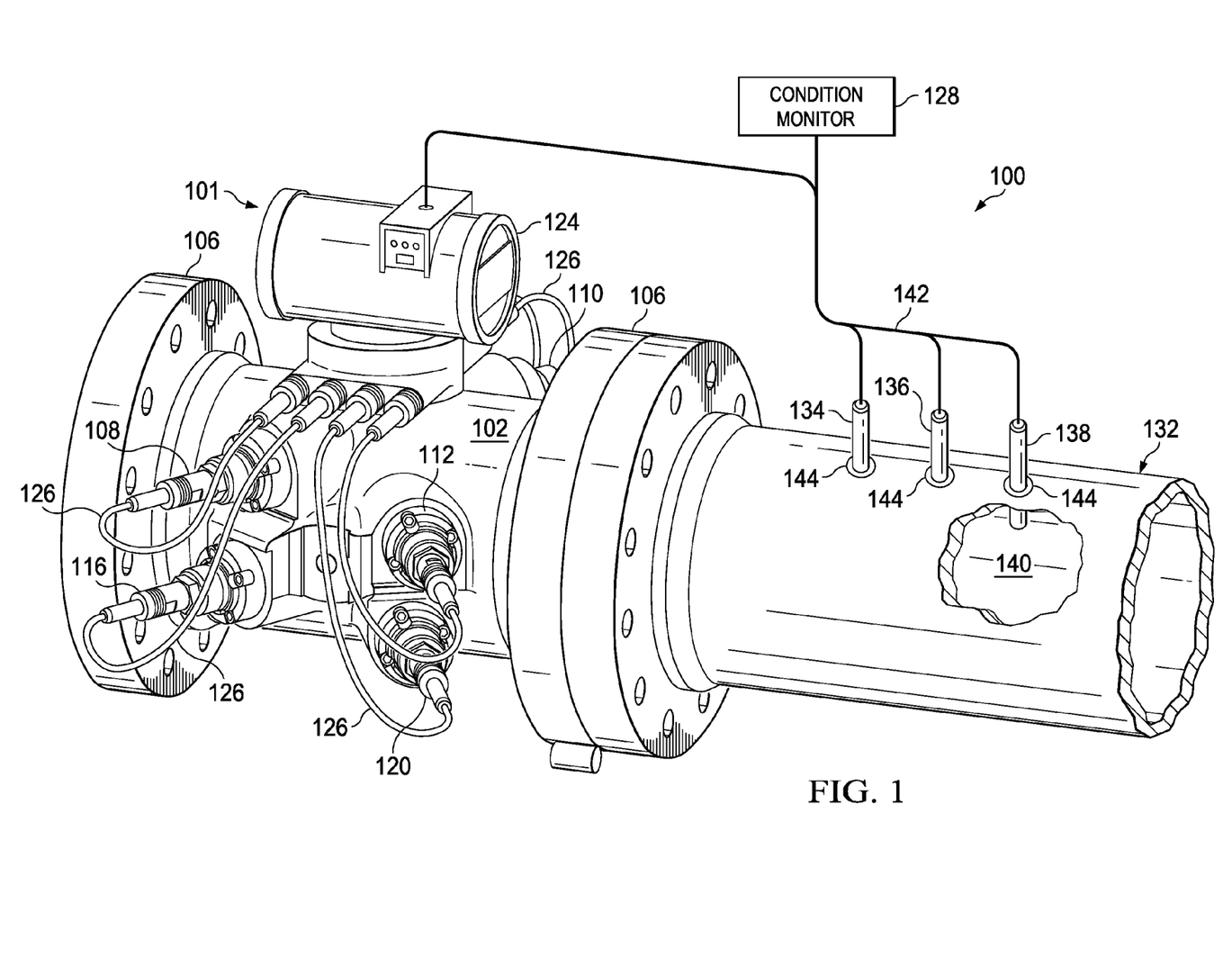
FIG. 1 shows an ultrasonic flow metering system in accordance with various embodiments.

FIG. 1 shows an ultrasonic flow metering system 100 in accordance with various embodiments. The system 100 includes an ultrasonic flow meter 101, sensors 134, 136 138, and a condition monitor 128. In the system 100, the ultrasonic flow meter 101 is coupled to a pipe or other structure 132. In some embodiments, the pipe 132 is disposed downstream of the ultrasonic flow meter 101. The pipe 132 includes openings 144 that allow sensors 134-138 to access the fluid stream flowing through the system 100. The condition monitor 128 is coupled to the sensors 134-138 and to the ultrasonic meter 101. In some embodiments, the condition monitor 128 may be part of a flow computer coupled to the ultrasonic meter 101. In other embodiments, the condition monitor 128 may be integrated with electronics 124 of the ultrasonic meter 101, or implemented as a discrete device.

The ultrasonic flow meter 101 includes a meter body or spool piece 102 that defines a central passage or bore. The spool piece 102 is designed and constructed to be coupled to a pipeline or other structure carrying fluids (e.g., natural gas) such that the fluids flowing in the pipeline travel through the central bore. While the fluids travel through the central bore, the ultrasonic flow meter 101 measures the flow rate (hence, the fluid may be referred to as the measured fluid). The spool piece 102 includes flanges 106 that facilitate coupling of the spool piece 102 to another structure. In other embodiments, any suitable system for coupling the spool piece 102 to a structure may be equivalently used (e.g., weld connections).

In order to measure fluid flow within the spool piece 102, the ultrasonic flow meter 101 includes a plurality of transducer assemblies. In the view of FIG. 1, five such transducers assemblies 108, 110, 112, 116 and 120 are in full or partial view. The transducer assemblies are paired (e.g., transducer assemblies 108 and 110), as will be further discussed below. Moreover, each transducer assembly electrically couples to control electronics package 124. More particularly, each transducer assembly is electrically coupled to the control electronics package 124 by way of a respective cable 126 or equivalent signal conducting assembly.

Figure 2:
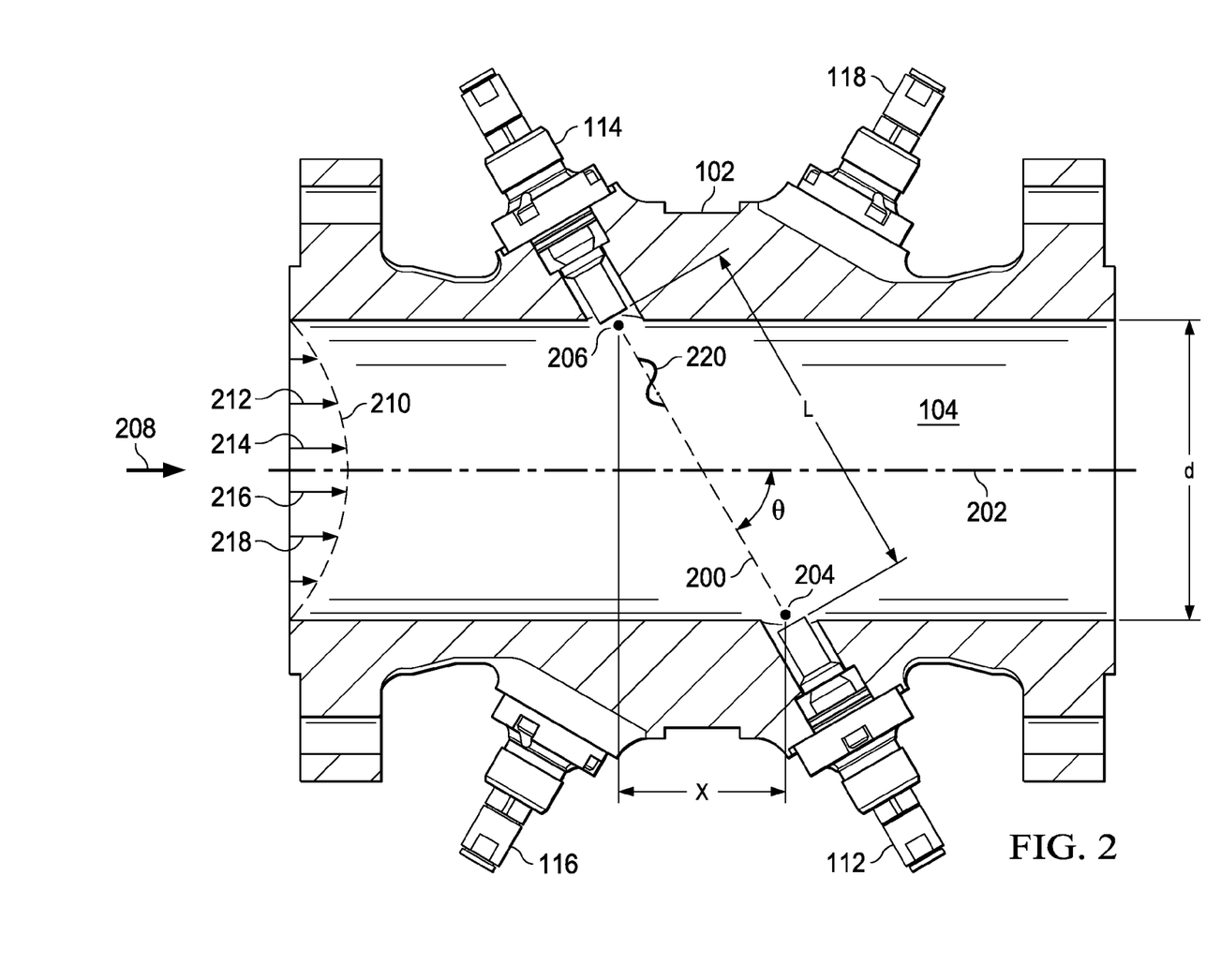
FIG. 2 shows a cross-sectional overhead view of an ultrasonic flow meter in accordance with various embodiments.

FIG. 2 shows a cross-sectional overhead view of the ultrasonic flow meter 101. Spool piece 102 has a predetermined size and defines the central bore 104 through which the measured fluid flows. An illustrative pair of transducers assemblies 112 and 114 is located along the length of spool piece 102. Transducers 112 and 114 are acoustic transceivers, and more particularly ultrasonic transceivers. The ultrasonic transducers 112, 114 both generate and receive acoustic signals having frequencies above about 20 kilohertz. The acoustic signals may be generated and received by a piezoelectric element in each transducer. To generate an ultrasonic signal, the piezoelectric element is stimulated electrically by way of a signal (e.g., a sinusoidal signal), and the element responds by vibrating. The vibration of the piezoelectric element generates the acoustic signal that travels through the measured fluid to the corresponding transducer assembly of the pair. Similarly, upon being struck by an acoustic signal, the receiving piezoelectric element vibrates and generates an electrical signal (e.g., a sinusoidal signal) that is detected, digitized, and analyzed by the electronics 124 associated with the flow meter 101.

A path 200, also referred to as a "chord," exists between illustrative transducer assemblies 112 and 114 at an angle θ to a centerline 202. The length of chord 200 is the distance between the face of transducer assembly 112 and the face of transducer assembly 114. Points 204 and 206 define the locations where acoustic signals generated by transducer assemblies 112 and 114 enter and leave fluid flowing through the spool piece 102 (i.e., the entrance to the spool piece bore).

The position of transducer assemblies 112 and 114 may be defined by the angle θ, by a first length L measured between the faces of the transducer assemblies 112 and 114, a second length X corresponding to the axial distance between points 204 and 206, and a third length d corresponding to the pipe inside diameter. In most cases, distances d, X, and L are precisely determined during flow meter fabrication. A measured fluid, such as natural gas, flows in a direction 208 with a velocity profile 210. Velocity vectors 212, 214, 216 and 218 illustrate that the gas velocity through spool piece 102 increases toward the centerline 202 of the spool piece 102.

Initially, downstream transducer assembly 112 generates an ultrasonic signal that is incident upon, and thus detected by, upstream transducer assembly 114. Sometime later, the upstream transducer assembly 114 generates a return ultrasonic signal that is subsequently incident upon, and detected by, the downstream transducer assembly 112. Thus, the transducer assemblies exchange or play "pitch and catch" with ultrasonic signals 220 along chordal path 200. During operation, this sequence may occur thousands of times per minute.

The transit time of an ultrasonic signal 220 between illustrative transducer assemblies 112 and 114 depends in part upon whether the ultrasonic signal 220 is traveling upstream or downstream with respect to the fluid flow. The transit time for an ultrasonic signal traveling downstream (i.e., in the same direction as the fluid flow) is less than its transit time when traveling upstream (i.e., against the fluid flow). The upstream and downstream transit times can be used to calculate the average velocity along the signal path, and the speed of sound in the measured fluid. Given the cross-sectional measurements of the flow meter 101 carrying the fluid, the average velocity over the area of the central bore 104 may be used to find the volume of fluid flowing through the spool piece 102.

Ultrasonic flow meters can have one or more chords. For example, the flow meter 101 includes four chordal paths at varying elevations within the spool piece 102. The flow velocity of the fluid may be determined at each chord to obtain chordal flow velocities, and the chordal flow velocities combined to determine an average flow velocity over the entire pipe. From the average flow velocity, the amount of fluid flowing in the spool piece, and thus the pipeline, may be determined.

Typically, the control electronics 124 causes the transducers (e.g., 112, 114) to fire and receives output signals from the transducers. The control electronics 124 may also compute the mean flow velocity for each chord, compute the mean flow velocity for the meter, compute the volumetric flow rate through the meter, compute speed of sound through the fluid, perform meter diagnostics, etc. The volumetric flow rate and other measured and computed values, such as flow velocity, speed of sound, etc. may be output to the condition monitor 128. As noted above, the condition monitor 128 may be included in the control electronics 124 in some embodiments.

For a given chord, the chordal flow velocity v is given by:

$$v = \frac{L^2}{2X} \cdot \frac{T_{up} - T_{dn}}{T_{up} T_{dn}}, \quad (2)$$

and the chordal speed of sound c is given by:

$$c = \frac{L}{2} \cdot \frac{T_{up} + T_{dn}}{T_{up} T_{dn}} \quad (3)$$

where:
L is the path length (i.e., face-to-face separation between upstream and downstream transducers),
X is the component of L within the meter bore in the direction of the flow, and
$T_{up}$ and $T_{dn}$ are the upstream and downstream transit times of sound energy through the fluid.

The average flow velocity through the meter 101 is given by:

$$v_{avg} = \sum_i w_i v_i \quad (4)$$

where:
$w_i$ is a chordal weighting factor,
$v_i$ is the measured chordal flow velocity, and
the summation i is over all chords.

Returning now to FIG. 1, the sensors 134-138 measure various attributes or parameters of the fluid, and may provide the measurements to the condition monitor 128 via signal conduction media 142 (e.g., wiring). The sensor 134 is a gas composition sensor, such as a gas chromatograph, that provides information indicative of the amount of each constituent of the gas flowing through the system 100. The sensor 136 is a pressure sensor that provides signals indicative of the pressure of the fluid flowing in the system 100. The sensor 138 is a temperature sensor (e.g., a resistance temperature detector) that provides signals indicative of the temperature of the fluid flowing through the system 100. The temperature sensor 138 extends into the interior passage 140 of the pipe 132, and measures the temperature of the fluid flowing through the system 100 at the terminus of sensor 138. Thus, the temperature sensor 138 is positioned to measure the temperature of the fluid at a specific elevation.

From the fluid composition, pressure, and temperature information provided by sensors 134, 136, and 138 respectively, the speed of sound through the fluid stream can be computed using predetermined theoretical or experimental values. For example, the condition monitor 128 may compute speed of sound in the fluid as specified in American Gas Association Report No. 10, "Speed of Sound in Natural Gas and Other Related Hydrocarbons" (AGA 10). Some embodiments of the condition monitor 128 may use this computed speed of sound to verify the speed of sound values measured for each chord of the meter 101.

Similarly, based on the speed of sound measurements provided by the ultrasonic flow meter 101 and the measurements provided by the sensors 134, 136, the condition monitor 128 can compute the temperature, pressure, and/or composition of the fluid flowing through the ultrasonic metering system 100. The condition monitor 128 may compute temperature, pressure, and/or composition using an iterative reverse of the speed of sound computation specified by AGA 10 based on the measured speed of sound provided by the ultrasonic meter 101 and measurements provided by the sensors 134-136.

Figure 3:
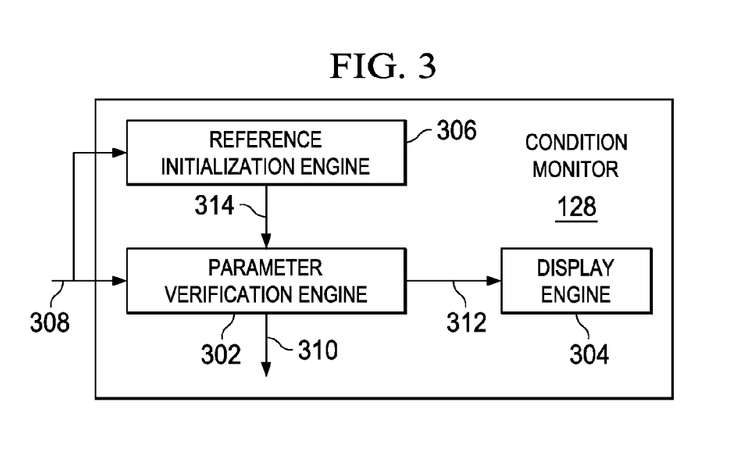
FIG. 3 shows a block diagram of a condition monitoring system in accordance with various embodiments.

FIG. 3 shows a block diagram of the condition monitor 128 in accordance with various embodiments. The condition monitor 128 includes a parameter verification engine 302, a reference initialization engine 306, and a display engine 304. The parameter verification engine 302 acquires values of various operational parameters 308 from the ultrasonic meter 101, the sensors 134-138, etc. and processes the parameter values to identify changes in operation of the metering system 100 that may be indicative of potential flow measurement inaccuracy or other deviations from expected operation. Embodiments of the parameter verification engine 302 may acquire and process values of parameters 308, where the parameters 308 include gains applied to ultrasonic transducers for detection of ultrasonic signals, flow profile factor, flow symmetry, crossflow, flow swirl, chordal signal-to-noise ratios, etc.

The parameter verification engine 302 identifies changes in operation of the flow metering system 100 by comparing values of each parameter to threshold values associated with the parameter. The threshold values define a range within which values of the parameter being processed are considered to indicate that the flow metering system 100 is operating properly. Conversely, values of the parameter falling outside the range defined by the thresholds may indicate that the flow metering system 100 is not operating properly. Thus, the parameter verification engine 302 determines whether values of a parameter are within an acceptable range of values for the parameter bounded by the thresholds, or outside the range of acceptable values. The parameter verification engine 302 may generated an alarm 310 based on a value of the parameter being outside of the range bounded by the thresholds.

The reference initialization engine 306 determines threshold values applicable to the parameters validated by the parameter verification engine 302, and provides the threshold values 314 to the parameter verification engine 302. To determine the threshold values 314, the reference initialization engine 306 acquires values of the parameter from the flow meter 101 and/or associated instrumentation (e.g., the transducers 134-138) during an initialization time interval (i.e., an initialization period). The time at which the initialization period begins and the duration or end time of the initialization period may be specified by a user of the condition monitor 128, subject to constraints imposed by the reference initialization engine 306 (e.g., minimum initialization period). The initialization period may encompass days, weeks, months, etc.

In some embodiments, the reference initialization engine 306 acquires and stores values of a parameter over a predetermined time interval (i.e. a reference initialization period). The time interval may be specified or initiated by a user, or triggered via a system startup and initialization mode. After the predetermined time interval or a portion thereof, the reference initialization engine 306 may process the stored values of the parameter to determine the threshold values 314. The portion of the values processed to determine the thresholds may be specified by an operator of the condition monitor 128 as the initialization period by specification of acquisition time or other selection method.

In conjunction with each value of the parameter acquired, the reference initialization engine 306 may compute or acquire a velocity or Reynolds number value corresponding to the fluid flowing through the flow meter 101 at the time the value of the parameter is acquired. The velocity of the fluid may be provided to the reference initialization engine 306 by the flow meter 101. The Reynolds number of the fluid may computed based on information provided by the flow meter 101 and the transducers 134-138.

The processing applied to the stored values of the parameter by the reference initialization engine 306 may include computing a mean (e.g., arithmetic mean) of the values over the initialization period. Some embodiments may apply more and/or different processing. In some embodiments, the stored values may be sorted in accordance with the velocity, Reynolds number, or other process condition associated with each value, and a mean computed for the values corresponding to a velocity/Reynolds number or range of velocities/Reynolds numbers. In some embodiments, outlying values of the parameter may be disregarded from mean computation. Outliers may be identified based on criteria such as stability of flow at time of acquisition, offset from the mean, etc. The condition monitor 128 applies the mean value or values as a reference value(s) (i.e., norms) that are indicative of expected values of the parameter (e.g., a value expected at a corresponding fluid velocity or Reynolds number). In some embodiments, the reference initialization engine 306 fits a function (e.g., fits a curve) to the mean values or interpolates between the mean values to generate the reference values.

The reference initialization engine 306 derives the threshold values from the reference values. Upper and lower threshold values may be established about the reference values to specify a range of acceptable values of the parameter. The thresholds may be formed as an offset from the reference values, where the magnitude of the offset is based on a predetermined offset value(s) (e.g., a predetermined minimum or maximum offset value) stored in the condition monitor 128 or "characteristic rules" stored in the condition monitor 128. The "characteristic rules" may be based on expert knowledge of flow metering system operation derived from study of the operation of such systems. Application of the predetermined offset value(s) and/or the characteristic rules ensure that the thresholds comply with recommend operational tolerances for the parameter (e.g., manufacturer and/or standard recommended tolerances).

The reference initialization engine 306 may also apply statistical information extracted from the parameter values used to determine the thresholds. For example, the standard deviation of the acquired values of the parameters or other value derived from population statistical analysis may be applied as an offset to the reference values to determine the thresholds.

The parameter verification engine 302 applies the threshold values 314 to validate values of the parameter acquired after the reference initialization period. The parameter verification engine 302 may generate an alarm 310 if the value of a parameter is outside the range established by the threshold values.

The display engine 304 generates displays for presentation of information provided by the parameter verification engine 302 to a user. For example, the display engine 304 may generate a display of values of a selected operational parameter of the ultrasonic meter 101 with respect to velocity or Reynolds number. The reference and threshold values associated with the parameter may also be displayed. In some embodiments, the display engine 304 may generate a display of differences (e.g., percent difference) between values of a parameter and corresponding reference values. The display engine 304 may present the display via a monitor as is known in the art (e.g., a flat panel monitor), a printer, or other display device.

In some embodiments of the condition monitor 128, the reference initialization engine 306 may also compute one or more reference bias values or site characterization values that represent systematic biases in the metering system 100. A reference bias value may be applied to values of a parameter of the metering system 100 to compensate for a systematic bias in the metering system 100. The reference initialization engine 306 may establish the reference bias values using data acquired during the reference initialization period. By applying the reference bias values to correct values of a parameter, the condition monitor 128 provides more accurate comparison of comparable values derived from different sources than conventional condition monitoring systems.

Figure 4A:
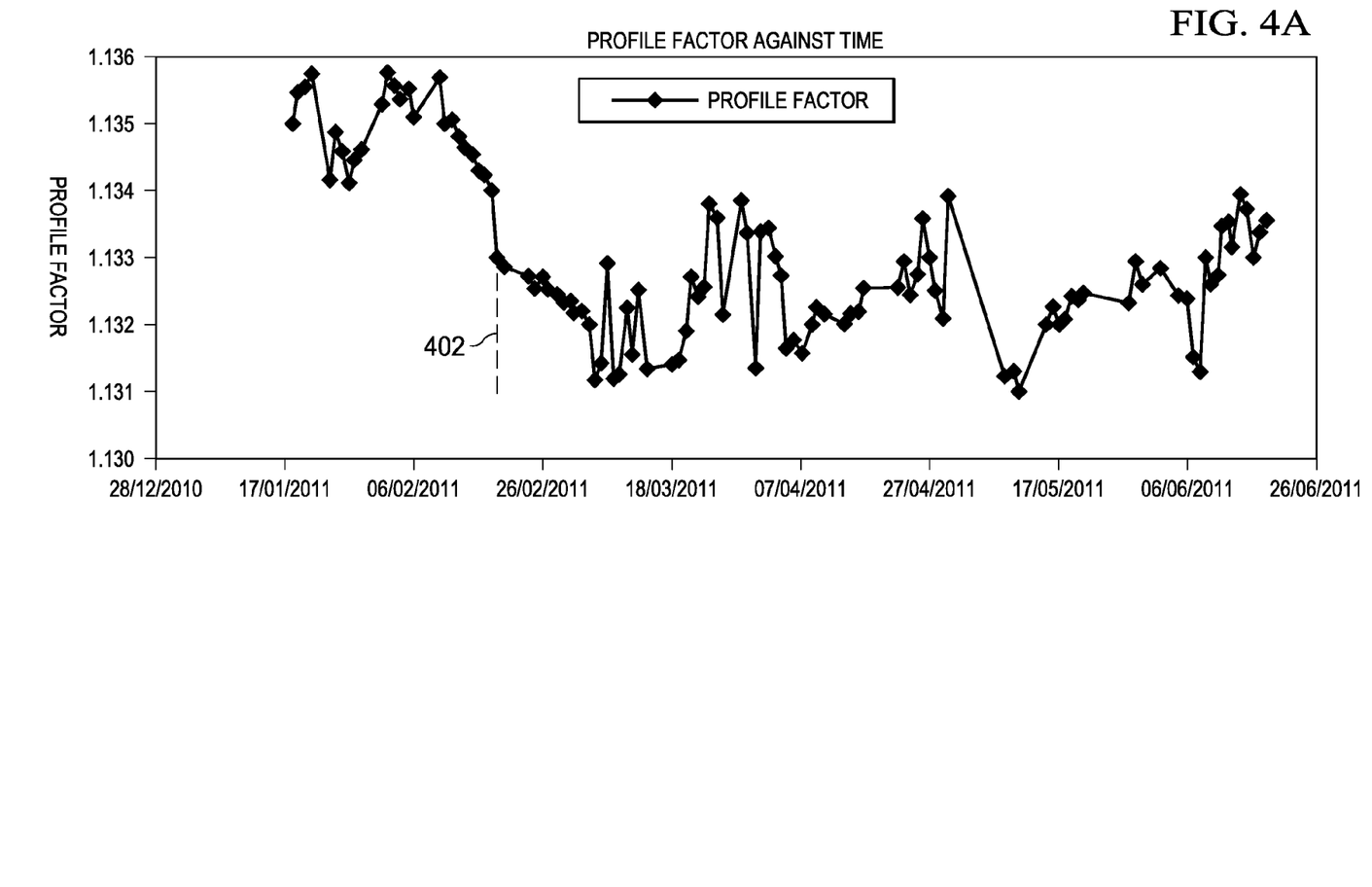
FIGS. 4A-4C show illustrative parameter values and alarm thresholds in accordance with various embodiments.

FIG. 4A shows percent difference between profile factor and reference values over a period of time from first fluid flow after installation of the metering system 100. Profile factor is one of many characteristics of the metering system 100. FIG. 4A shows that at first fluid flow, contaminates are present in the line, such as swarf, cleaning and preservation fluids etc. that travelled down the pipeline. These contaminates are generally flushed out of the pipeline within the first 3 months of operation. FIG. 4A shows that the contaminates cause a shift in profile factor values at about time 402.

Figure 4B:
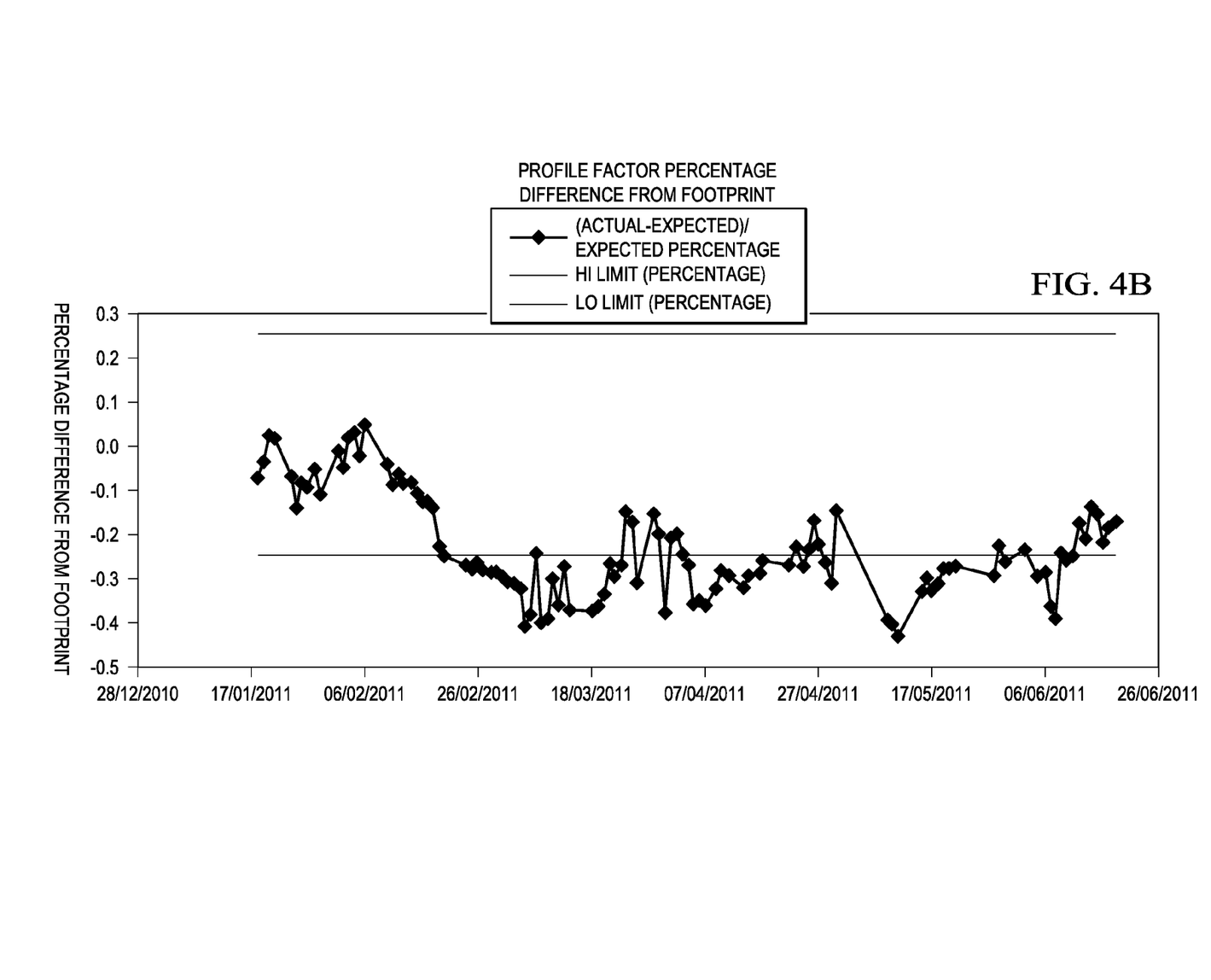

FIG. 4B shows the profile factor data of FIG. 4A and threshold values established by a metering system expert based on the site characteristics observed during a site visit at startup of the system 100, and knowledge of allowable deviations from the norm. FIG. 4B shows that profile factor difference values exceed the thresholds established by the system expert after the shift at time 402. When the profile factor exceeds the thresholds at any time, the metering is assumed to be suspect, or changes in site conditions have occurred, and prompt investigation by personnel skilled in the specifics of ultrasonic metering, which may require consultation with the manufacturer of the ultrasonic meter 101.

Because the system expert was present on site for first fluid flow, the thresholds established could not consider the effects of contamination in the pipeline. Consequently, an additional visit by the system expert is required to reestablish the expected metering system behavior after the effects of the contaminants have dissipated. Until the system expert returns and establishes new threshold values, the condition monitor 128 will generate false alarms. As the contaminates dissipate from the pipeline, the metering system characteristics stabilize at a characteristic value outside the previously established thresholds.

Thus, an inherent difficulty with manually establishing thresholds by a system expert is that the thresholds are derived from personal observation and analysis of a limited dataset, while the expert is onsite, and may also be at time of first flow, when other factors such as contamination of fluid may adversely affect the establishment of the thresholds.

Figure 4C:
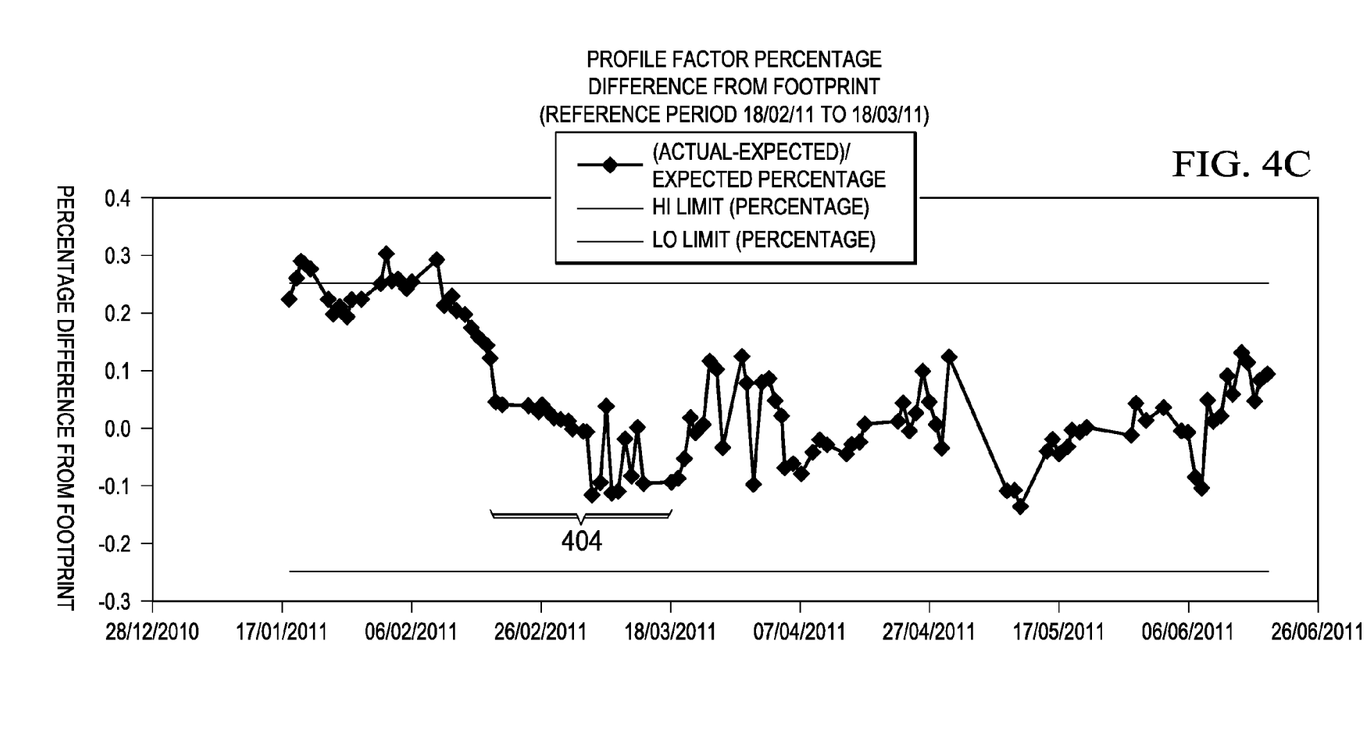

FIG. 4C the profile factor data of FIG. 4A and threshold values established automatically by the condition monitor 128. As explained above, the condition monitor 128 acquires and analyzes data over a reference initialization period, which may be user selected, and establishes the threshold values based on acquired data. In FIG. 4C, the condition monitor 128 has established thresholds based on the data acquired during the period 404. By establishing thresholds based on the data acquired during the interval 404, the condition monitor 128 is able to avoid generation of nuisance alarms by validating the profile factor values against thresholds that reflect the operation of the system 100 after dissipation of contaminates. Thus, embodiments of the condition monitor 128 reduce the overall cost of ownership because a system expert is not required to analyze and establish the threshold values for each parameter of the system 100.

Embodiments of the parameter verification engine 302, the reference initialization engine 306, and the display engine 304 may include hardware resources or hardware and software resources (i.e., instructions) to perform the functions disclosed herein. For example, some embodiments of the parameter verification engine 302, the reference initialization engine 306, and the display engine 304 may be implemented as one or more processors executing instructions retrieved from a computer-readable storage medium. Processors suitable for implementing the engines 302, 304, 306 may include general-purpose microprocessors, digital signal processors, microcontrollers, or other devices capable of executing instructions retrieved from a computer-readable storage medium. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. A non-transitory computer-readable storage medium suitable for storing instructions of the engines 302, 304, 306 may include volatile storage such as random access memory, non-volatile storage (e.g., a hard drive, an optical storage device (e.g., CD or DVD), FLASH storage, read-only-memory), or combinations thereof.

Some embodiments of the parameter verification engine 302, the reference initialization engine 306, the display engine 304, and other engines or portions of the condition monitor 128 disclosed herein may be implemented as hardware circuitry configured to perform the functions disclosed herein. Selection of a hardware or processor/instruction implementation of embodiments is a design choice based on a variety of factors, such as cost, time to implement, and the ability to incorporate changed or additional functionality in the future.

Figure 5:
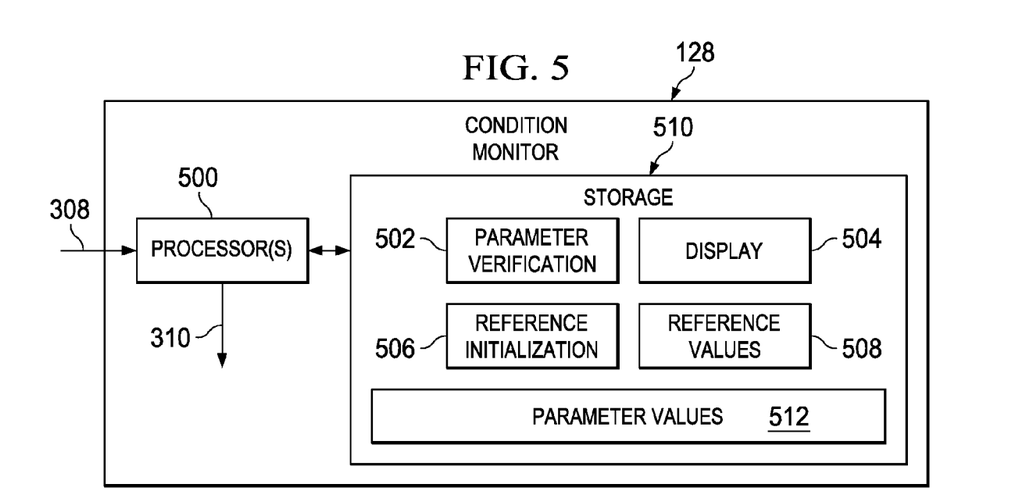
FIG. 5 shows a block diagram of a processor-based embodiment of a condition monitor in accordance with various embodiments.

FIG. 5 shows a block diagram of a processor-based embodiment of the condition monitor 128. The embodiment of the condition monitor 128 shown in FIG. 5 includes a processor 500 and storage 510 coupled to the processor 500. The processor 500 is an instruction execution device as described above. The storage 510 is a computer-readable medium as described above. The processor 500 retrieves and executes instructions stored in the storage 510, reads data from the storage 510, writes data to the storage 510, and communicates with other systems and devices. The storage 510 includes a parameter verification module 502, a reference initialization module 506, and a display module 504 which respectively include instructions for implementing the parameter verification engine 302, the reference initialization engine 306, and the display engine 304. The storage 510 may also include processed and/or unprocessed parameter values 512 (e.g., transducer gain values, profile factor values, Reynolds number values, alarm information, etc.), reference values 508 that correspond to the parameters processed, threshold values, etc. The processor-based condition monitor 128 shown in FIG. 5 may include various other components, such as network adapters, video interfaces, peripheral interfaces, etc. that have been omitted from FIG. 5 in the interest of clarity.

Figure 6:
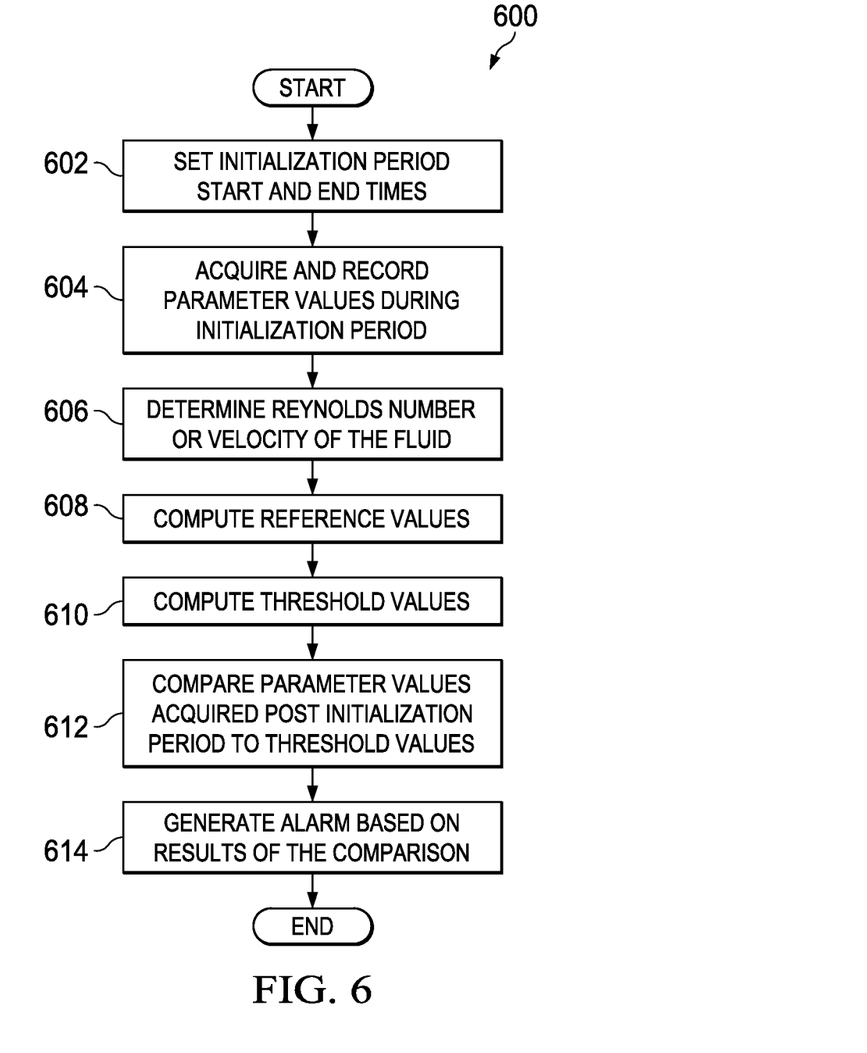
FIG. 6 shows a flow diagram for a method for monitoring the condition of an ultrasonic flow metering system in accordance with various embodiments.

FIG. 6 shows a flow diagram for a method 600 for monitoring the condition of an ultrasonic flow metering system 100 in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 600, as well as other operations described herein, can be implemented as instructions stored in computer readable medium 510 and executed by the processor 500.

In block 602, a reference initialization period is defined and entered into the condition monitor 128. The initialization period may be defined prior to, subsequent to, or during acquisition of the values of a selected parameter for which a reference value and threshold values are to be determined. The initialization period may defined by a user in some embodiments.

In block 604, fluid is flowing through the central passage 104 of the ultrasonic flow meter 101, and the flow metering system 100 is measuring the volume of fluid flowing through the passage 104. The condition monitor 128 is acquiring values of an operational parameter of the ultrasonic flow meter 101 and/or associated instrumentation. In practice, the condition monitor 128 may acquire a plurality of values for each of a plurality of operational parameters of the flow meter 101 and/or associated instrumentation. Parameters for which values are acquired may include gains applied to ultrasonic transducer output, gain span, flow profile factor, flow symmetry, crossflow, flow swirl, chordal signal-to-noise ratios, chordal velocity ratios (including chordal velocity vs flow weighted mean velocity, flow profile, symmetry, cross flow), flow turbulence, measured velocity/speed of sound, measured temperature, measured gas composition, measured pressure, flow swirl diagnostics, measured vs. computed temperature, ultrasonic performance (percentage of overall ultrasounds actually received), ultrasonic peak switch diagnostics, turbulence diagnostics, etc. More specifically, during the defined initialization period, the condition monitor is acquiring and recording values of the selected parameter for which reference and threshold values are to be established.

In block 606, the condition monitor 128 determines the velocity and/or Reynolds number of the fluid flowing through the flow meter 101. The flow velocity may be computed by the flow meter 101 and provided to the condition monitor 128 or computed by the condition monitor 128 based on information, such as chordal transit times, provided by the flow meter 101. Embodiments may compute the Reynolds number, based on information provided by the flow meter 101 and associated transducers 134-138 in accordance with any method known in the art.

In block 608, the condition monitor 128 computes reference values for the selected parameter. A reference value may be computed for values of the selected parameter corresponding to a velocity, Reynolds number, or other flow characteristic. The condition monitor may determine the reference value as an average of the parameter values and/or apply other processing as disclosed herein.

In block 610, the condition monitor 128 computes threshold values for the selected parameter. The threshold values indicate a range of acceptable values of the parameter at a respective Reynolds number, velocity, etc. The threshold values may be computed as offsets from the reference values based on standard and/or expert derived offset values stored in the condition monitor 128, and/or statistical information derived from the values of the selected parameter.

In block 612, the condition monitor 128 compares values of the selected parameter acquired after the initialization period the thresholds. If a value of the parameter exceeds the corresponding thresholds (i.e., is outside the range established by the thresholds), then in block 614, the condition monitor 128 generates an alarm corresponding to the parameter. If the value of the parameter does not exceeds the corresponding thresholds (i.e., is within the range established by the thresholds), then the condition monitor 128 does not generate an alarm corresponding to the parameter.

The above discussion is meant to be illustrative of the principles and various exemplary embodiments of the present invention. Numerous variations and modifications will become apparent to those skilled in the art once the above disclosure is fully appreciated. For example, while embodiments of the invention have been described with regard to an ultrasonic flow meter, those skilled in the art understand that embodiments are equally applicable to other types of flow meters. It is intended that the following claims be interpreted to embrace all such variations and modifications.

What is claimed is:

1. A flow metering system, comprising:
   a flow meter configured to measure volume of fluid flowing through the flow meter; and
   a condition monitor coupled to the flow meter and configured to:
      monitor a parameter of operation of the flow meter;
      record values of the parameter over a predetermined time interval as recorded values;
      determine reference values for the parameter based on the recorded values; and
      apply the reference values to values of the parameter acquired after the predetermined time interval to validate operation of the flow metering system.

2. The system of claim 1, wherein the condition monitor is configured to:
   determine threshold values based on the reference values; and
   compare the values of the parameter acquired after the predetermined time interval to the threshold values.

3. The system of claim 2, wherein the condition monitor is configured to:
   determine the threshold values based on an offset from a corresponding one of the reference values; and
   determine the offset based on at least one of a predetermined tolerance value and standard deviation of the recorded values.

4. The system of claim 1, wherein the parameter comprises one of ultrasonic transducer gain, gain span, chordal signal to noise ratio, chordal velocity, chordal velocity ratios, chordal velocity versus flow weighted mean velocity, flow profile, symmetry, cross flow, spread of chordal velocities, fluid swirl diagnostics, velocity/speed of sound, measured versus computed temperature, ultrasonic performance, ultrasonic peak switch diagnostics, and turbulence diagnostics.

5. The system of claim 1, wherein the condition monitor is configured to determine the reference values by computing a mean of the recorded values.

6. The system of claim 1, wherein the condition monitor is configured to compute each of the reference values as a mean of recorded values corresponding to a predetermined range of one of velocity and Reynolds number of the fluid flowing through the flow meter at a time each of the recorded values was acquired.

7. The system of claim 1 wherein the condition monitor is configured to compute the reference values by fitting a function to points derived from the recorded values.

8. A method for monitoring operation of a flow metering system, comprising:
   acquiring and recording, as recorded values, by a monitoring system, values of a parameter of operation of the flow metering system during a predetermined reference initialization interval of operation of the flow metering system;
   determining reference values for the parameter based on the recorded values of the parameter;
   validating the operation of the flow metering system by applying the reference values to values of the parameter acquired after the reference initialization interval.

9. The method of claim 8, further comprising selecting the parameter from a group consisting of ultrasonic transducer gain, gain span, chordal signal to noise ratio, chordal velocity, chordal velocity ratios, chordal velocity versus flow weighted mean velocity, flow profile, symmetry, cross flow, spread of chordal velocities, fluid swirl diagnostics, velocity/speed of sound, measured versus computed temperature, ultrasonic performance, ultrasonic peak switch diagnostics and turbulence diagnostics.

10. The method of claim 8, further comprising:
determining threshold values based on the reference values; and
comparing the values of the parameter acquired after the reference initialization interval to the threshold values.

11. The method of claim 10, further comprising:
determining the threshold values based on an offset from a corresponding one of the reference values; and
determining the offset based on at least one of a predetermined tolerance value and standard deviation of the recorded values.

12. The method of claim 8, wherein determining the reference values comprises determining the reference values as a mean of the recorded values.

13. The method of claim 8, wherein determining the reference values comprises computing each of the reference values as a mean of the recorded values corresponding to a predetermined range of one of velocity and Reynolds number of the fluid flowing through the flow meter at a time each of the recorded values was acquired.

14. The method of claim 8, wherein determining the reference values comprises computing the reference values by fitting a function to points derived from the recorded values.

15. A condition monitoring system for monitoring operation of a flow metering system, comprising:
a reference initialization engine configured to:
record, as recorded values, values of a parameter of operation of the flow metering system over a predetermined initialization time interval of operation of the flow metering system;
determine reference values for the parameter based on the recorded values; and
a parameter verification engine configured to:
apply the reference values to values of the parameter acquired after the initialization time interval to validate operation of the flow metering system.

16. The system of claim 15, wherein the parameter comprises one of ultrasonic transducer gain, gain span, chordal signal to noise ratio, chordal velocity, chordal velocity ratios, chordal velocity versus flow weighted mean velocity, flow profile, symmetry, cross flow, spread of chordal velocities, fluid swirl diagnostics, velocity/speed of sound, measured versus computed temperature, ultrasonic performance, ultrasonic peak switch diagnostics, and turbulence diagnostics.

17. The system of claim 15 wherein the reference initialization engine is configured to determine threshold values based on reference values; and the parameter verification engine is configured to compare the values of the parameter acquired after the predetermined time interval to the threshold values.

18. The system of claim 17, wherein the reference initialization engine is configured to:
determine the threshold values based on an offset from a corresponding one of the reference values; and
determine the offset based on at least one of a predetermined tolerance value and standard deviation of the recorded values.

19. The system of claim 15, wherein the reference initialization engine is configured to determine the reference values by computing a mean of the recorded values.

20. The system of claim 15, wherein the reference initialization engine is configured to compute each of the reference values as a mean of the recorded values corresponding to a predetermined range of one of velocity and Reynolds number of the fluid flowing through the flow metering system at a time each of the recorded values was acquired.

21. The system of claim 15, wherein the reference initialization engine is configured to compute the reference values by fitting a function to points derived from the recorded values.

* * * * *